United States Patent [19]

Guckel

[11] 3,775,561

[45] Nov. 27, 1973

[54] WIDE-BAND TRANSMISSION LINE DIRECTIONAL COUPLER

[75] Inventor: Henry Guckel, Madison, Wis.

[73] Assignee: Wisconsin Alumni Research Foundation, Madison, Wis.

[22] Filed: Jan. 21, 1972

[21] Appl. No.: 219,726

[52] U.S. Cl. .............................. 178/58 R, 307/286
[51] Int. Cl. ............................................. H04l 5/14
[58] Field of Search ...................... 178/58 R, 59, 60, 178/58 A; 307/286; 333/13

[56] References Cited

UNITED STATES PATENTS

| | | | |
|---|---|---|---|
| 3,566,031 | 2/1971 | Carbone | 178/59 |
| 3,209,170 | 9/1965 | Cooperman | 307/286 |
| 3,218,467 | 11/1965 | Bently | 307/286 |
| 3,054,906 | 9/1962 | King | 307/286 |

*Primary Examiner*—Kathleen H. Claffy
*Assistant Examiner*—David L. Stewart
*Attorney*—Marshall A. Burmeister et al.

[57] ABSTRACT

Wide-band directional couplers are provided whereby a transmission line may be utilized for simultaneous sending and receiving of data processing and other signals. The decoding between sent and received signals is accomplished by the transmission line couplers. Each coupler may employ first and second inserted transmission lines having sending and receiving ends. The signals to be transmitted are supplied in duplicate to the sending ends of both inserted transmission lines by sending means which also may include matching impedances to provide reflectionless termination of the sending ends of both lines. The bi-directional transmission line is connected to the receiving end of the first inserted transmission line by matching means whereby the characteristic impedances of both the bi-directional line and the first inserted line are matched to avoid reflection. The receiving end of the second inserted line is given a matched termination to avoid reflection. The incoming signal from the bi-directional transmission line is received by receiving means connected between the receiving ends of the first and second inserted transmission lines, such receiving means being responsive to the differential signals beteeen the inserted lines so that the duplicate transmitted signals are balanced out. The receiving means may include a differential amplifier. The sending means may utilize a transistor driving amplifier having separate outputs to supply the transmitted signals to the first and second inserted transmission lines. Active elements may be employed in the sending and receiving means to provide negative admittance. Thus, a tunnel diode may be utilized in the sending means to provide balanced driving for the sending ends of the inserted transmission lines. The tunnel diode also provides power gain. Another tunnel diode may be utilized in the receiving means to provide power gain.

14 Claims, 7 Drawing Figures

WIDE-BAND TRANSMISSION LINE DIRECTIONAL COUPLER

This invention relates to wide-band directional couplers for transmission lines, especially those adapted to handle signals with widely varying frequency components, such as data processing signals or the like.

One object of the present invention is to provide wide-band directional couplers which may be employed in connection with a transmission line so as to render the transmission system simultaneously bi-directional. In this way, the transmission line can be employed for transmitting signals simultaneously in both directions along the line.

The present invention is particularly applicable to the transmission of signals having widely ranging frequency components so that the transmission line and the associated directional couplers are required to have an extremely wide pass band.

Directional couplers have been devised in the past, but have generally had the disadvantage of severely limiting the width of the pass band. For example, directional couplers have been developed in which the directivity is achieved by utilizing reflections from the mismatched ends of inserted transmission lines. However, the use of such reflections makes the coupler operate most efficiently at a particular frequency so that the coupler is useable for only a narrow pass band centered about such frequency. Such directional couplers are unsatisfactory for handling complex pulse signals and other signals having widely ranging frequency components.

On the other hand, the directional couplers of the present invention do not impose any substantial limitation upon the pass band of the transmission system with which the couplers are used.

The objects of the present invention are preferably achieved by providing a directional coupler having first and second inserted transmission lines for use in connection with the basic transmission line to be utilized for simultaneous bi-directional transmission. The signals to be transmitted are applied to sending means which supplies the transmitted signals in duplicate to the sending ends of both inserted transmission lines. At the same time, the sending means provides reflectionless terminations of the sending ends of the inserted transmission lines so as to avoid any reflection of the signals received from the basic transmission line.

The receiving end of the first inserted transmission line is preferably connected to the basic transmission line by matching means which provides an impedance match so as to avoid any reflection of either the transmitted or received signals. The second inserted transmission line is given a reflectionless termination at its receiving end. The receiving ends of both the first and second inserted transmission lines are connected to receiving means responsive to differential signals so that the duplicate transmitted signals are balanced out. On the other hand, the received signals from the basic transmission line are present between the receiving ends of the first and second inserted lines and thus are applied to the receiving means so as to produce a corresponding output therefrom. The receiving means may comprise a differential amplifier. The duplicate transmitted signals may be supplied to the sending ends of the inserted transmission lines by a driver amplifier which may utilize separate transistors to drive the two lines.

Various modified embodiments of the coupler may be produced. In one such embodiment, active elements such as tunnel diodes may be employed to produce negative admittance. For example, one such tunnel diode may be employed in the sending means to provide a balanced drive for the two inserted transmission lines, while also providing power gain. Another tunnel diode may be utilized in the receiving means to provide power gain so as to overcome some of the insertion loss of the directional coupler.

Further objects, advantages and features of the present invention will appear from the following description, taken with the accompanying drawings, in which.

Figures 1, 2, 3:
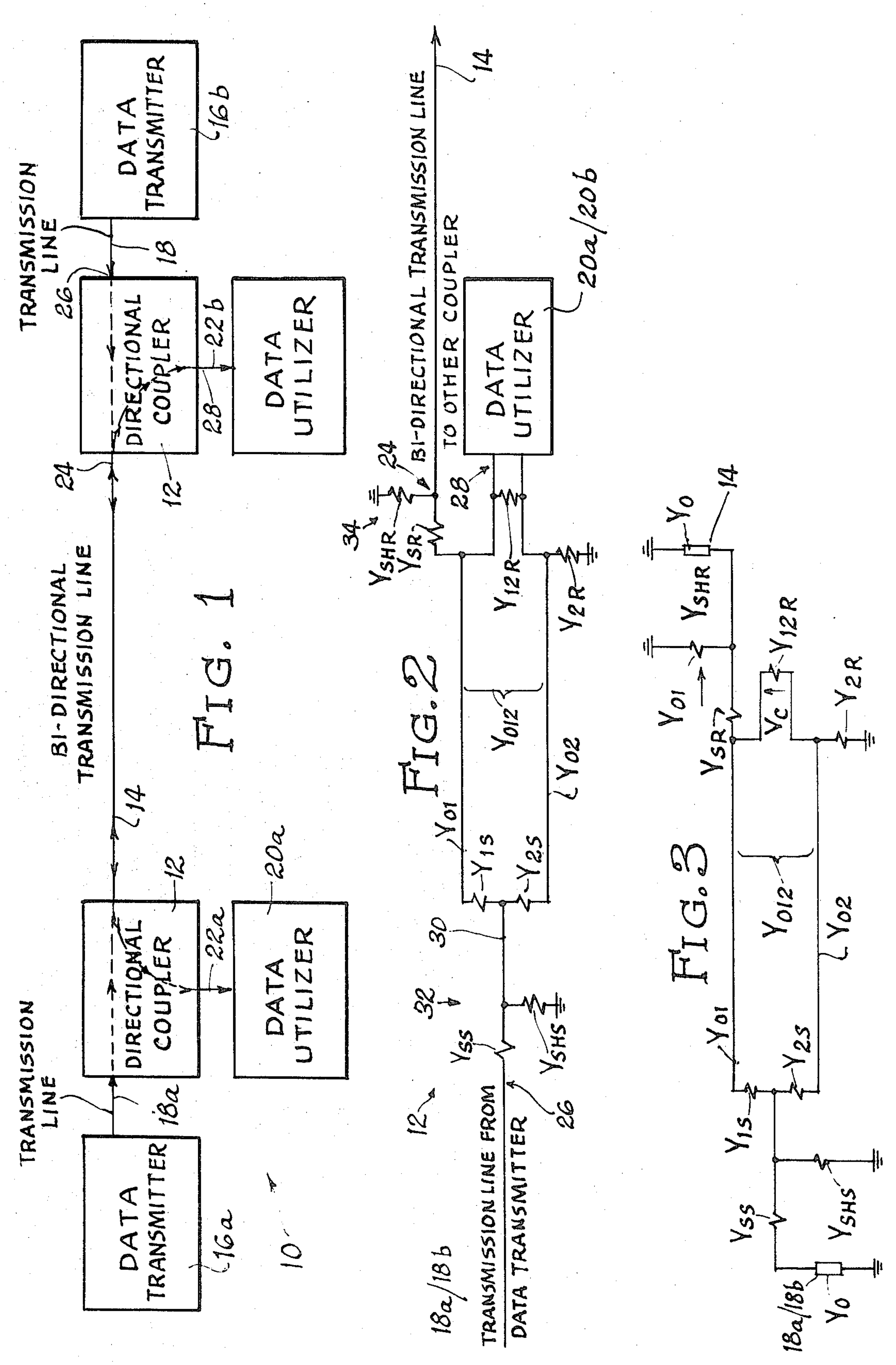
FIG. 1 is a block diagram showing the manner in which the directional couplers of the present invention are employed in connection with the transmission line.
FIG. 2 is a schematic circuit diagram of a directional coupler to be described as an illustrative embodiment of the present invention.
FIG. 3 is an equivalent diagram showing the directional coupler in FIG. 2 in slightly modified form.

As just indicated, FIG. 1 illustrates a transmission line system 10 in which two directional couplers 12 are employed in connection with a basic transmission line 14 to render the transmission system simultaneously bi-directional. In this case, the transmission line system 10 is employed to handle data processing signals, but it will be understood that the invention is applicable to the transmission of a wide variety of signals.

The illustrated directional couplers 12 are connected to the opposite ends of the transmission line 14. However, it is possible to insert one of the directional couplers into the transmission line at any desired point. As shown in FIG. 1, the directional couplers 12 at the opposite ends of the transmission line 14 receive transmitted signals from data transmitters **16*a* and *b*. If desired, the connections between the data transmitters 16*a* and *b* and the corresponding directional couplers 12 may be in the form of additional transmission lines 18*a* and *b* which may be regarded as extensions of the basic transmission line 14**.

The directional couplers 12 receive signals from the basic transmission line 14 and direct such received signals to data utilizing devices **20*a* and *b*. The construction of the directional couplers 12 is such that each data utilizing device 20*a* or *b* receives incoming signals from the basic transmission line 14, but not from the corresponding data transmitter 16*a* or *b*. Thus, the data utilizing device 20*a* receives the data signals transmitted over the transmission line 14 from the data transmitter 16*b* at the opposite end of the line. Similarly, the data utilizer 20*b* receives the data signals transmitted over the line 14 from the data transmitter 16*a***.

Directional couplers 12 are connected to the corresponding data utilizers 20*a* and *b* by links 22*a* and *b* which may be in the form of additional transmission lines, if desired. It will be recognized that each directional coupler 12 is provided with a transmission line port or terminal 24, a sending port or terminal 26, and a receiving port or terminal 28.

The basic transmission line 14 is preferably of the coaxial type, having an axial or central conductor and an outer generally cylindrical conductor. However, the transmission line may be of any known or suitable type, as desired. These remarks are also applicable to the additional transmission lines 18*a*, 18*b*, 22*a* and 22*b*.

Each directional coupler 12 may be of the construction illustrated in FIG. 2. As shown, the directional coupler 12 comprises two inserted transmission lines $Y_{01}$ and $Y_{02}$. The terms $Y_{01}$ and $Y_{02}$ not only identify the inserted transmission lines, but also represent their characteristic admittances. Here again, the inserted transmission lines are preferably of the coaxial type, but may be of any known or suitable type.

The two inserted transmission lines are coupled in that the circuit arrangement of the directional coupler 12 is such that the central conductors of the inserted lines are shared to form a third inserted transmission line, designated $Y_{012}$, which also represents the characteristic admittance of the third or shared transmission line.

The sending ends of the inserted transmission lines $Y_{01}$ and $Y_{02}$ are preferably supplied with duplicate or identical transmitted signals. As shown, the duplicate transmitted signals are supplied to the sending ends of the inserted transmission lines $Y_{01}$ and $Y_{02}$ through impedance elements $Y_{1S}$ and $Y_{2S}$ connected to the center tap or junction conductor 30. The terms $Y_{1S}$ and $Y_{2S}$ represent the admittances of the impedance elements. The transmission line 18*a*/18*b* from the corresponding data transmitter may be connected to the conductor 30 by an impedance matching network or circuit 32, illustrated as comprising a series impedance or admittance $Y_{SS}$ and a shunt impedance or admittance $Y_{SHS}$.

The inserted transmission lines $Y_{01}$ and $Y_{02}$ are of sufficient length to function substantially in the manner of transmission lines of indefinite length. As will be explained in detail presently, the inserted transmission lines are given reflectionless terminations at both ends. In this way, the directional coupler is capable of handling an extremely wide frequency band.

At the receiving ends of the inserted transmission lines $Y_{01}$ and $Y_{02}$, one of the inserted lines, in this case the inserted transmission line $Y_{01}$, is connected to the basic transmission line 14 by an impedance matching network or circuit 34 illustrated as comprising a series impedance or admittance $Y_{SR}$ and a shunt impedance or admittance $Y_{SHR}$. The matching circuit 34 is such that the inserted transmission line $Y_{01}$ is terminated in its characteristic impedance or admittance so that no reflection of the transmitted signal occurs. Likewise, the matching network 34 is such that the basic transmission line 14 is terminated in its characteristic impedance or admittance so that there is no reflection of the received signals arriving over the transmission line 14.

An impedance element or admittance $Y_{2R}$ is connected to the receiving end of the second-inserted transmission line $Y_{02}$ and is of such a value that the second line is terminated in its characteristic impedance or admittance so that there is no reflection of the transmitted signals arriving over the transmission line.

The output of the received signals is taken between the receiving ends of the inserted transmission lines $Y_{01}$ and $Y_{02}$. Thus, the data utilizer 20*a*/20*b* is connected between the receiving ends of the lines $Y_{01}$ and $Y_{02}$. In other words, the data utilizer is connected to the receiving end of the shared or mutual transmission line $Y_{012}$. An impedance or admittance element $Y_{12R}$ is preferably connected across the receiving end of the shared line $Y_{012}$. While the value of this admittance element is preferably such as to terminate the line $Y_{012}$ in its characteristic admittance, this factor is not critical because the duplicate transmitted signals arriving over the inserted lines $Y_{01}$ and $Y_{02}$ normally balance out so that no signal is normally received over the shared or mutual line $Y_{012}$. The data utilizer or other output device 20a/20b is preferably responsive to the differential signals between the receiving ends of the inserted transmission lines $Y_{01}$ and $Y_{02}$.

The diagrammatic representation of FIG. 3 is much the same as FIG. 2, except that the basic transmission line 14 is represented by its characteristic admittance, designated $Y_0$. The same characteristic admittance $Y_0$ is also shown for the transmission line 18*a*/18*b*. In the usual case, the transmission line 18*a*/18*b* is an extension of the basic transmission line 14 and thus has the same characteristic admittance. However, the characteristic admittances may be different, if desired.

As already indicated, the transmitted signals are supplied in duplicate by the balanced admittance elements $Y_{1S}$ and $Y_{2S}$ to the sending ends of the inserted transmission lines $Y_{01}$ and $Y_{02}$. The duplicate signals are transmitted over the inserted lines to the receiving ends thereof. The duplicate transmitted signals balance out at the receiving port, which is taken across the shared line $Y_{012}$ between the inserted lines $Y_{01}$ and $Y_{02}$. Thus, the receiving device 20*a*/20*b* does not receive any of the transmitted signal. However, the matching network 34 carries the transmitted signal from the inserted line $Y_{01}$ to the basic transmission line 14. The impedances of the lines are matched so that there is no reflection of the transmitted signals.

At the receiving end of the second inserted line $Y_{02}$, the duplicate transmitted signals are absorbed by the matching impedance element $Y_{2R}$ so that there is no reflection.

The received signals coming in from the basic transmission line 14 are applied to the receiving end of the first inserted transmission line $Y_{01}$ through the matching network 34, which terminates the basic line 14 in its characteristic admittance so that there is no reflection of the received signals. Through a voltage divider action, a portion of the received signals appears across the receiving end of the shared line $Y_{012}$ and thus is applied to the data utilizer 20*a*/20*b*, while another portion of the received signals appears across the receiving end of the second-inserted line $Y_{02}$. Normally, the impedance across the receiving end of the shared line $Y_{012}$ is considerably greater than the impedance across the receiving end of the second inserted line $Y_{02}$ so that the major portion of the received signals appears across the data utilizer 20*a*/20*b*.

The received signals are transmitted along the first inserted line $Y_{01}$ to the sending end thereof. Similarly, a portion of the received signals is transmitted along the second inserted line $Y_{02}$ to the sending end thereof.

The matching network 32 and the impedance elements $Y_{1S}$ and $Y_{2S}$ are arranged so as to terminate both lines $Y_{01}$ and $Y_{02}$ in their characteristic impedances so that no reflection of the received signals occurs at the sending ends of the lines. A portion of the received signals is transmitted by the matching network 32 to the transmission line 18*a*/18*b*. From this observation, it will be evident that the directional coupler 12 can be inserted into the basic transmission line 14 at any intermediate point, if desired.

The directional coupler 12 operates without any reflection of the transmitted and received signals. Thus, the directional coupler imposes virtually no limitation upon the band width of the basic transmission line 14. Thus, wide-band operation is preserved. The insertion loss of the directional coupler can readily be overcome by using suitable amplifiers, preferably of the transistorized type.

Figure 4:
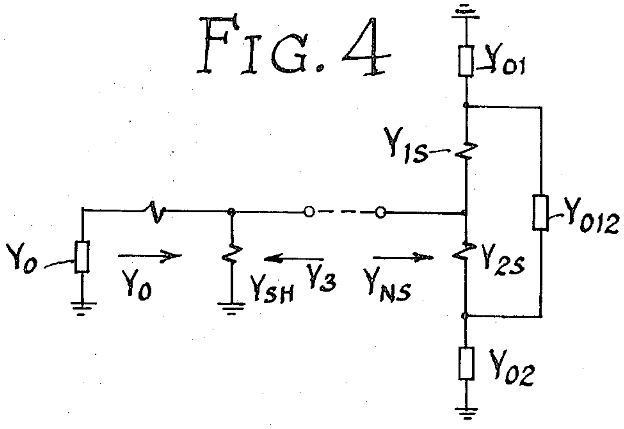
FIG. 4 is an equivalent diagram illustrating the impedance matching of the directional coupler at the sending end.

FIG. 4 illustrates the impedance matching of the directional coupler at the sending ends of the inserted transmission lines $Y_{01}$ and $Y_{02}$. For the symmetrical case in which $Y_{01}$ equals $Y_{02}$, the input admittance $Y_{NS}$ at the sending end is given by the following equation:

$$Y_{NS} = Y_{01}\ [(1 + Y_{012}/(Y_{01}+Y_{012})]$$

The termination admittance $Y_3$ is given by the following equation:

$$Y_3 = Y_{01}\ (2 + Y_{01}/Y_{012})$$

It is necessary to determine the two admittances $Y_{SS}$ and $Y_{SHS}$. They may be determined from the following equations:

$$Y_0=[Y_{SS}(Y_{SHS}+Y_{NS})]/(Y_{SS}+Y_{SHS}+Y_{NS})$$

$$Y_3 = Y_{SHS}+Y_{SS}\ Y_0/(Y_{SS}+Y_0)$$

Algebraic solutions of the preceding equations result in the following equations from which $Y_{SS}$ and $Y_{SHS}$ can be determined:

$$Y_{SS}= Y_0/[1 - 2Y_0/(Y_3+Y_{NS})]^{1/2}$$

$$Y_{SHS}=\frac{Y_0}{1-\left[1-\dfrac{2Y_0}{Y_3+Y_{NS}}\right]^{1/2}}-Y_{NS}$$

Figure 5:
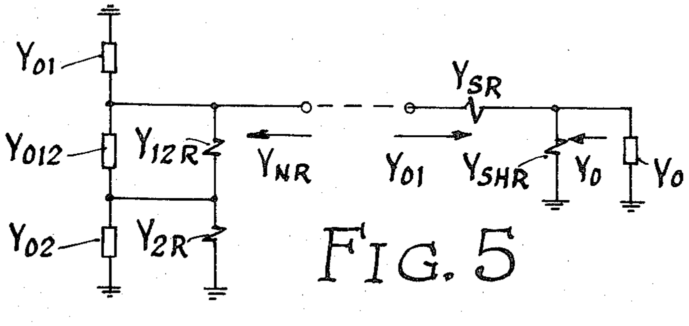
FIG. 5 is an equivalent diagram illustrating the impedance matching of the directional coupler at the receiving end.

FIG. 5 illustrates the impedance matching at the receiving end of the inserted transmission lines $Y_{01}$ and $Y_{02}$. For the symmetrical case in which $Y_{01}$ equals $Y_{02}$, the input admittance $Y_{NR}$ is given by the following equation:

$$Y_{NR} = Y_{01} +[2Y_{01}\ (Y_{12R} + Y_{012}\ )]/(2Y_0+Y_{12R} + Y_{012})$$

The shunt and series admittances $Y_{SHR}$ and $Y_{SR}$ may be determined from the following equations:

$$Y_{SHR} = Y_0\ [1 - (2/Y_0)\ (Y_{NR}Y_{01}/Y_{NR} + Y_{01})]^{1/2}$$

$$(1/Y_{SR}) = 1/Y_0 - 1/(Y_0 + Y_{SHR})$$

Figure 6:
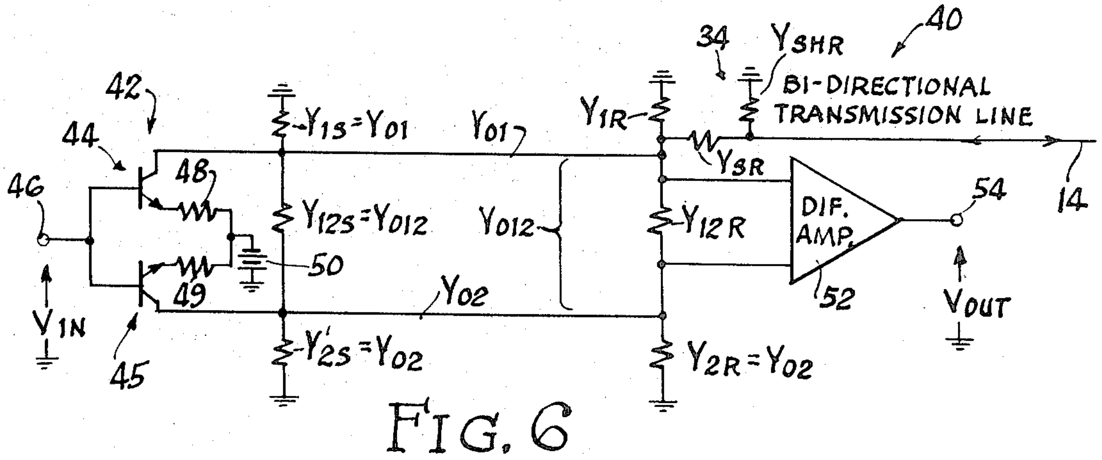
FIG. 6 is a schematic circuit diagram of a modified directional coupler.

FIG. 6 illustrates a modified directional coupler 40 which is generally similar to the coupler 10 of FIG. 2. However, the directional coupler employs input or sending means in the form of a transistorized driving amplifier 42 connected to the sending ends of the inserted transmission lines $Y_{01}$ and $Y_{02}$. The amplifier 42 provides duplicate input signals to the lines $Y_{01}$ and $Y_{02}$, while also making up for the insertion loss produced by the directional coupler.

It will be seen from FIG. 6 that the driving amplifier preferably comprises two transistors 44 and 45 having their bases connected to an input terminal 46 adapted to receive the signals $V_{IN}$ to be transmitted, such signals being applied between the input terminal 46 and ground. The collectors of the transistors 44 and 45 are connected to the sending ends of the inserted transmission lines $Y_{01}$ and $Y_{02}$. Biasing resistors 48 and 49 are preferably connected from the emitters of the transistors 44 and 45 to one side of a power supply illustrated as a battery 50. The other side of the battery 50 is grounded.

Preferably, the sending ends of the inserted transmission lines $Y_{01}$ and $Y_{02}$ are provided with terminating or matching impedances of admittances illustrated as including admittance elements $Y'_{1S}$ and $Y'_{2S}$ connected between ground and the sending ends of the respective inserted transmission lines $Y_{01}$ and $Y_{02}$. An admittance element $Y_{12S}$ is also connected between the lines $Y_{01}$ and $Y_{02}$. The values of the admittance elements $Y'_{1S}$, $Y'_{2S}$ and $Y_{12S}$ may correspond to the characteristic admittances of the inserted transmission lines $Y_{01}$, $Y_{02}$ and $Y_{012}$ so that the sending ends of the inserted transmission lines will be given reflectionless terminations. Thus, the received signals, which travel between the receiving and sending ends of the inserted transmission lines, will not be reflected at the sending ends.

The driving amplifier 42 of FIG. 6 provides power gain and also delivers amplified duplicate transmitted signals to the sending ends of the inserted transmission lines $Y_{01}$ and $Y_{02}$. Such signals correspond to the input signals $V_{IN}$.

The directional coupler 40 of FIG. 6 also differs from the previously-described coupler in that the input of a differential amplifier is connected between the receiving ends of the inserted transmission lines $Y_{01}$ and $Y_{02}$ to receive and amplify the signals received from the basic transmission line 14. The differential amplifier 52 responds to differential signals between the receiving ends of the inserted transmission lines. Thus, the duplicate transmitted signals are balanced out, while the unbalanced received signals are amplified. The differential amplifier 52 has an output terminal 54. It will be understood that the amplified output signals $V_{OUT}$ appear between the output terminal 54 and ground.

The receiving ends of the inserted transmission lines $Y_{01}$ and $Y_{02}$ are matched or terminated so as to avoid any reflection of the transmitted and received signals. The matching arrangement is the same as in FIG. 2, except that an additional matching or terminating admittance element $Y_{1R}$ is connected between ground and the receiving end of the inserted transmission line $Y_{01}$.

The value of the terminating admittance element $Y_{2R}$ preferably corresponds to the characteristic admittance of the inserted transmission line $Y_{02}$. The value of the admittance element $Y_{12R}$ is not critical and may be made small in terms of admittance or large in terms of impedance so as to maximize the received signals as supplied to the differential amplifier 52. The values of the admittance elements $Y_{1R}$, $Y_{SR}$ and $Y_{SHR}$ are such as to provide a reflectionless match between the inserted transmission line $Y_{01}$ and the basic transmission line 14.

Figure 7:
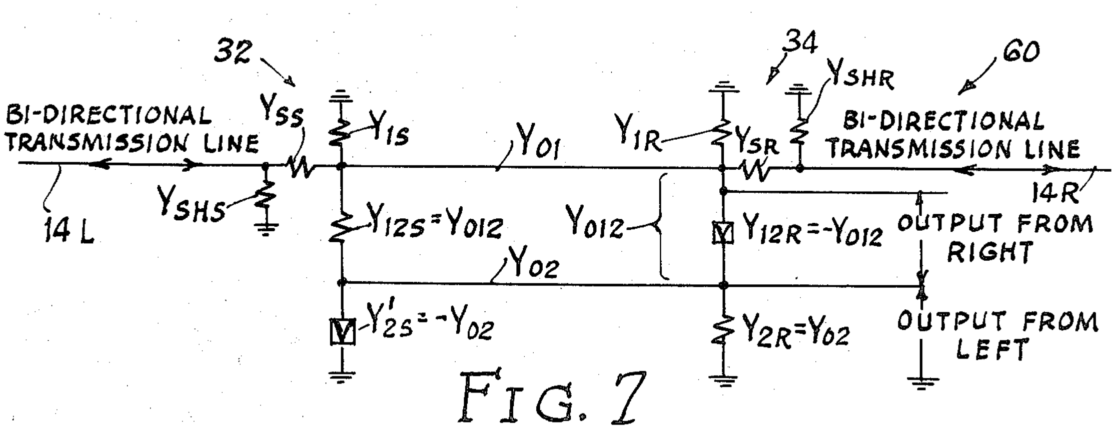
FIG. 7 is a schematic circuit diagram of another modified directional coupler utilizing tunnel diodes as active elements.

FIG. 7 illustrates another modified directional coupler 60 which is similar to the couplers of FIGS. 2 and 6, but differs in that active elements are employed to provide power gain and to assist in the impedance matching.

The directional coupler 60 of FIG. 7 is particularly well adapted to be inserted at any point into the basic transmission line 14. Thus, in FIG. 7, the directional coupler 60 is shown as being connected between left and right hand legs 14L and 14R of the basic transmission line. The left leg 14L of the basic transmission line is matched to the sending end of the inserted transmission line $Y_{01}$ by the same matching network 32, previously described, comprising shunt and series admittance elements $Y_{SHS}$ and $Y_{SS}$. An additional matching admittance element $Y_{1S}$ may be connected between ground and the sending end of the inserted transmission line $Y_{01}$.

As described previously in connection with FIG. 6, a terminating admittance element $Y_{12S}$ is preferably connected between the sending ends of the inserted transmission lines $Y_{01}$ and $Y_{02}$.

As illustrated in FIG. 7, an active element illustrated as a tunnel diode, designated $Y'_{2S}$, is connected across the sending end of the second inserted transmission line $Y_{02}$ so that one side of the tunnel diode is grounded. Preferably, the tunnel diode $Y'_{2S}$ provides a negative admittance corresponding to the positive input admittance of the inserted transmission line $Y_{02}$.

With this arrangement, the tunnel diode balances out or neutralizes the input admittance of the line $Y_{02}$ so that the line effectively presents an open circuit to the terminating admittance element $Y_{12S}$. Thus, there is no drop across the admittance element $Y_{12S}$ with the result that the transmitted signals at the sending ends of the inserted transmission lines $Y_{01}$ and $Y_{02}$ are identical. Thus, the tunnel diode $Y'_{2S}$ provides the duplicate transmitted signals which are required for driving the inserted transmission lines $Y_{01}$ and $Y_{02}$. The tunnel diode also provides power gain. The tunnel diode $Y'_{2S}$ is operated in its small signal mode and may be suitably biased, as desired.

The provision of the tunnel diode $Y'_{2S}$ also facilitates the impedance matching between the transmission lines 14L and $Y_{01}$, particularly if both lines have the same characteristic admittance. In that case, no matching is needed because the terminating admittance element $Y_{12S}$ draws no current. The left hand transmission line 14L can be connected directly to the input end of the inserted transmission line $Y_{01}$, and the matching elements $Y_{SHS}$, $Y_{SS}$ and $Y_{1S}$ can be omitted.

At the receiving ends of the inserted transmission lines $Y_{01}$ and $Y_{02}$, the arrangement of FIG. 7 is similar to that of FIG. 6, except that another active element is connected between the receivings ends of the inserted transmission lines $Y_{01}$ and $Y_{02}$, such active element being illustrated as a tunnel diode designated $Y'_{12R}$. Preferably, the tunnel diode provides a negative admittance corresponding to the positive characteristic admittance of the shared line $Y_{012}$ so that the input admittance of the shared line is balanced out or neutralized. With this arrangement, the magnitude of the received signals is maximized across the tunnel diode $Y'_{2R}$. These signals correspond to the signals received from the right hand leg 14R of the transmission line. If desired, the differential amplifier 52 of FIG. 6 may be employed to amplify such received signals.

In the arrangment of FIG. 7, the signals received from the left hand leg 14L of the transmission line appear across the terminating admittance element $Y_{2R}$ at the receiving end of the inserted line $Y_{02}$. Because of the provision of the tunnel diode $Y'_{12R}$, the received signals from the right hand leg 14R are balanced out across $Y_{2R}$. The tunnel diode also provides power gain to overcome some of the insertion loss of the directional coupler 60 of FIG. 7.

Here again, the tunnel diode $Y'_{12R}$ assists in the impedance matching of the transmission lines $Y_{01}$ and 14R, particularly if the characteristic admittances of these lines are the same. In that case, the right hand leg 14R of the basic transmission line can be connected directly to the receiving end of the transmission line $Y_{01}$, and all of the matching elements $Y_{SHR}$, $Y_{SR}$ and $Y_{1R}$ can be omitted.

It will be evident that the directional couplers of the present invention provide full directional selectivity so that the transmission line system can be made simultaneously bi-directional. Moreover, the directional couplers give fully wide-band performance in that directional couplers are free from all reflections and thus do not impose any band width limitations upon the transmission line system.

I Claim:

1. A wide band directional coupler for a bi-directional transmission line adapted to transmit outgoing signals and incoming signals simultaneously, comprising first and second transmission line sections having sending and receiving ends, said first and second transmission line sections being of equal length, sending means connected to said sending ends of both of said first and second transmission line sections for feeding duplicate transmitted signals to both of said first and second transmission line sections, first bi-directional matching means for connecting the receiving end of said first transmission line section to said bi-directional transmission line while matching the characteristic impedances of said first transmission line section and said bi-directional transmission line to avoid any reflection, said first matching means being effective to feed the transmitted signals to said bi-directional transmission line, while also simultaneously transmitting incoming signals therefrom, second matching means for matching the characteristic impedance of said second transmission line section at its receiving end to avoid any reflection, and differentially responsive receiving means connected between the receiving ends of said first and second transmission line sections for receiving the incoming signals from said bi-directional transmission line, said sending means including third matching means for matching thc characteristic impedances of said first and second transmission line sections at the sending ends thereof to avoid any reflection of the incoming signals, said receiving means being responsive to differential signals between the receiving ends of said first and second transmission line sections whereby the duplicate transmitted signals are balanced out.

2. A coupler according to claim 1, in which said sending means includes first and second impedances connected in series between the sending ends of said first and second transmission line sections, and means for supplying the transmitted signals to the junction between said first and second impedances.

3. A coupler according to claim 1, in which said sending means includes first and second impedances connected in series between the sending ends of said first and second transmission line sections, said first and second impedances having a junction therebetween, said sending means including a source of the transmitted signals and a series matching impedance connected between said source and said junction, said sending means including a shunt matching impedance connected to said junction and in shunting relation to said source.

4. A coupler according to claim 3, in which said source includes an additional transmission line connected to said series impedance.

5. A coupler according to claim 1, in which said sending means includes first and second impendances connected in series between the sending ends of said transmission line sections, said impendances having a junction therebetween and an additional transmission line for bringing in the transmitted signals, and matching impedance means connected between said additional transmission line and said junction.

6. A coupler according to claim 1, in which said first matching means includes shunt and series matching impedances connected to the receiving end of said first transmission line section and adapted to be connected to the bi-directional transmission line.

7. A coupler according to claim 1, in which said second matching means includes an impedance corresponding to the characteristic impedance of said second transmission line section.

8. A coupler according to claim 1, in which said receiving means includes a differential amplifier.

9. A coupler according to claim 1, in which said sending means includes a driver amplifier having duplicate output means connected to the sending ends of said first and second transmission line sections.

10. A coupler according to claim 1, in which said third matching means includes first and second terminating impedances connected to the sending ends of said first and second transmission line sections and corresponding to the characteristic impedances thereof, and a third terminating impedance connected between the sending ends of said first and second transmission line sections.

11. A coupler according to claim 1, in which said sending means includes a source of the transmitted signals connected to the sending end of one of said transmission line sections, a matching impedance connected between the sending ends of said first and second transmission line sections, and an active circuit element affording negative admittance and connected to the sending end of the other transmission line section to provide negative admittance so as to equalize the transmitted signals developed at the sending ends of said first and second transmission line sections.

12. A coupler according to claim 11, in which said active circuit element includes a tunnel diode.

13. A coupler according to claim 1, in which said receiving means includes an active circuit element connected between the receiving ends of said first and second transmission line sections to provide negative admittance therebetween.

14. A coupler according to claim 13, in which said active circuit element includes a tunnel diode.

* * * * *